Jan. 21, 1930.  J. F. DE TOVAROS  1,744,622
CURRENT COLLECTOR FOR ELECTRIC VEHICLES
Filed July 17, 1925   3 Sheets-Sheet 1
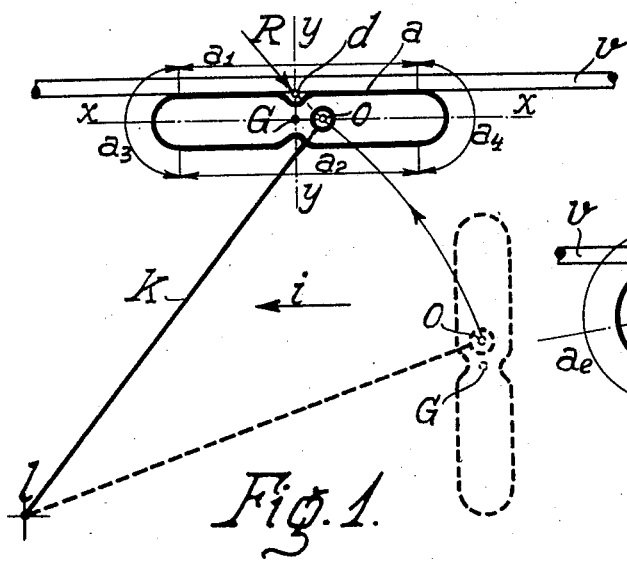
Fig.1.
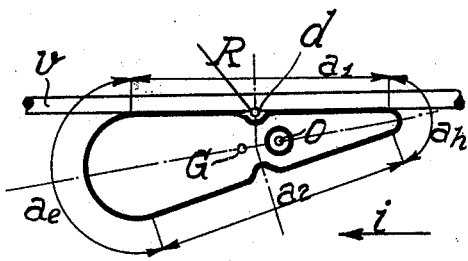
Fig.3.
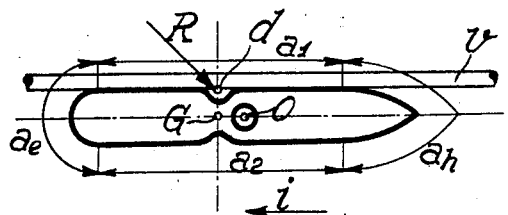
Fig.2.
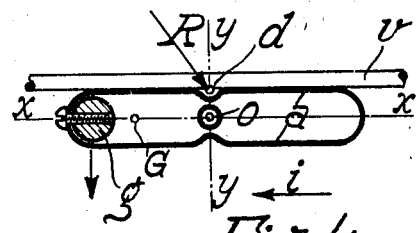
Fig.4.
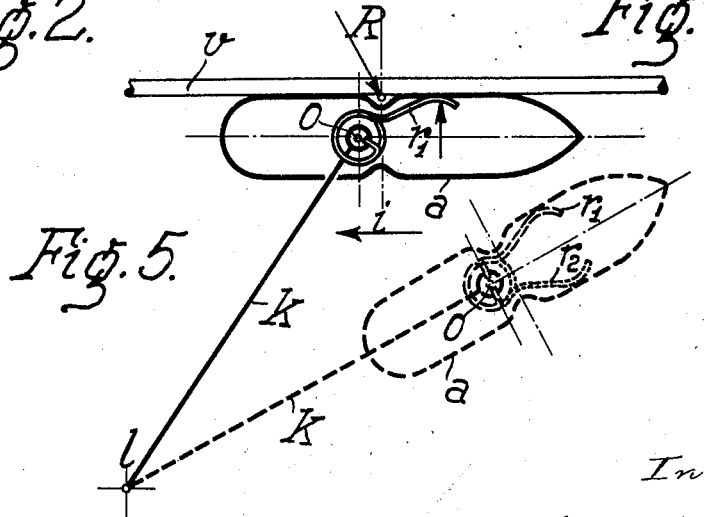
Fig.5.
Inventor:
Julius Fischer de Tóváros
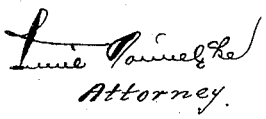
Attorney.

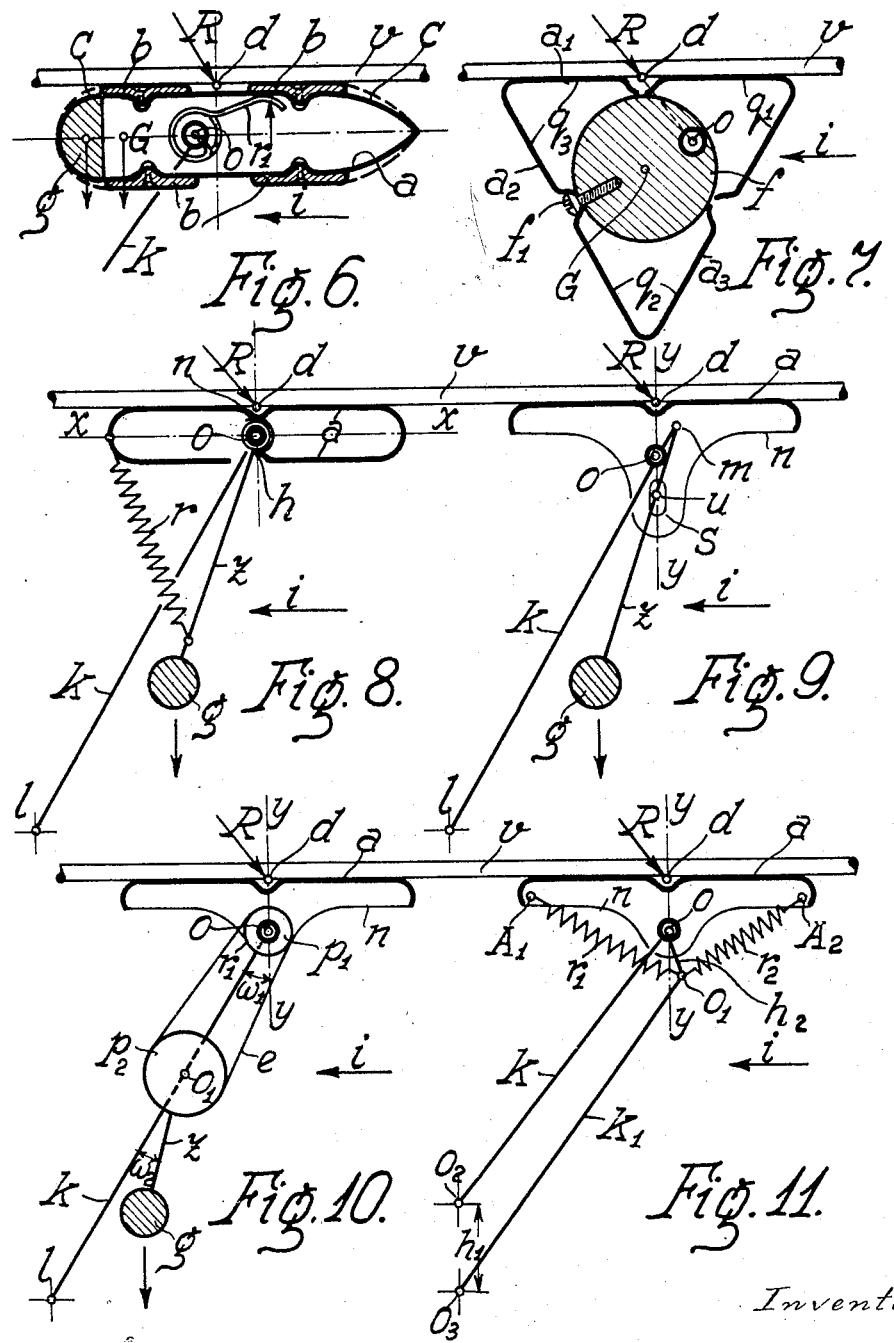

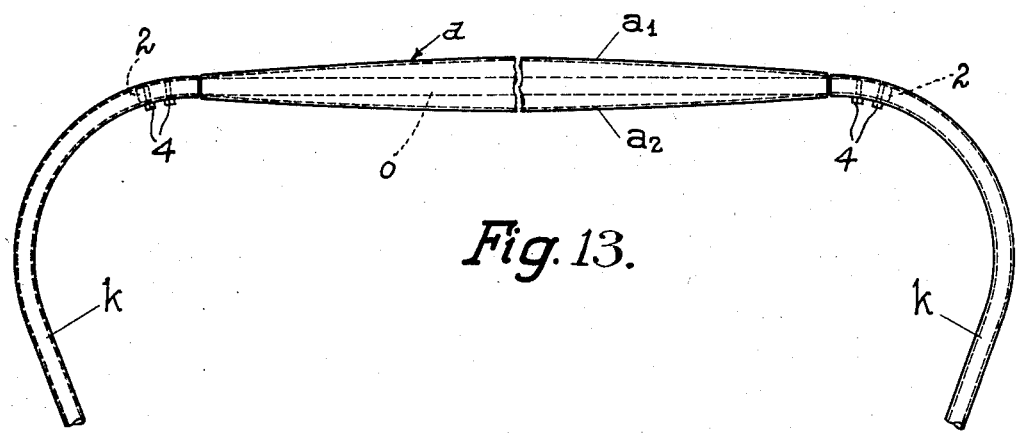
Fig. 13.
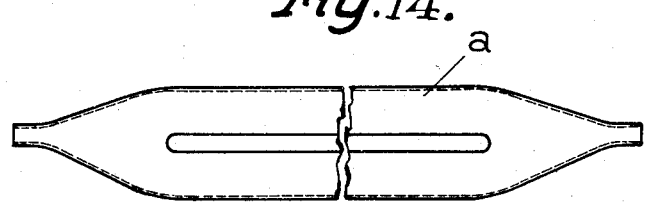
Fig. 14.
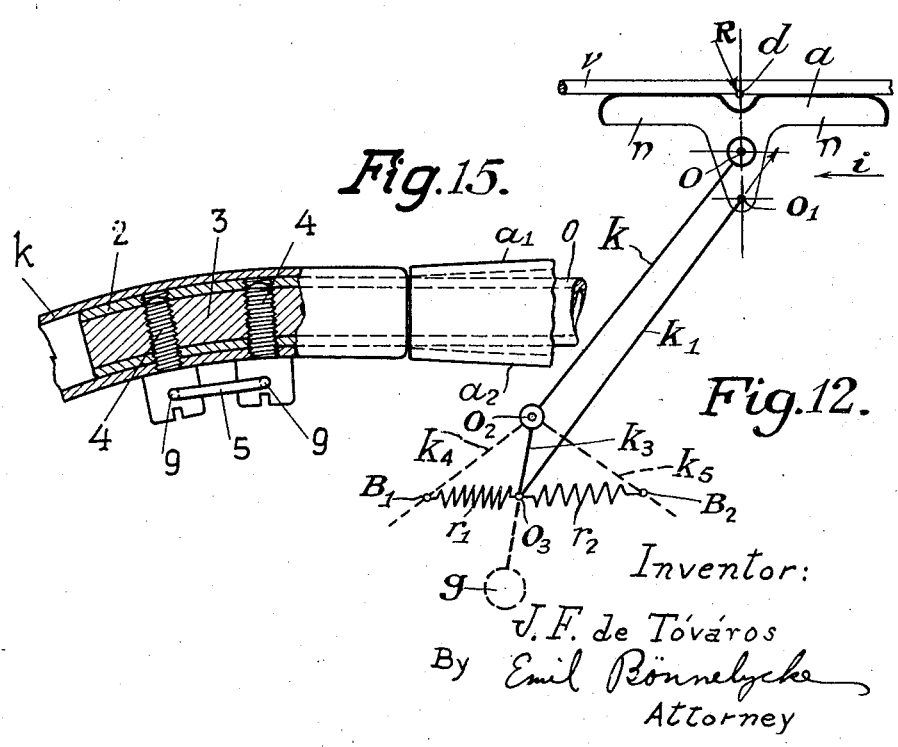
Fig. 15.
Fig. 12.

Patented Jan. 21, 1930

1,744,622

UNITED STATES PATENT OFFICE

JULIUS FISCHER DE TÓVÁROS, OF BUDAPEST, HUNGARY

CURRENT COLLECTOR FOR ELECTRIC VEHICLES

Application filed July 17, 1925, Serial No. 44,298, and in Hungary July 23, 1924.

My invention relates to sliding current collecting shoes for electric vehicles of the type having a flat contact surface of substantial extent in the direction of the trolley wire, pivotally mounted on the trolley frame or pole and intended to be used on frames arranged at an acute angle to the trolley wire. The object of the invention is to secure not only a perfect contact along the whole length of the contact surface of the shoe collector at any angle of the frame, but also a practically uniform distribution of the contact pressure over the whole contact surface in either travelling direction after the trolley frame has been tilted into the position corresponding to the travelling direction.

In the annexed drawing I have shown several embodiments of the trolley shoe according to my invention in sectional elevations.

Fig. 1 shows an eccentrically pivoted double-faced shoe.

Figs. 2 and 3 show modified forms of shoes.

Fig. 4 shows a centrally pivoted shoe with an eccentric balancing weight lodged therein.

Figs. 5 and 6 show eccentrically pivoted shoes with internal springs.

Fig. 7 shows an eccentrically pivoted three-faced contact piece or shoe.

Fig. 8 shows a centrally pivoted double-faced shoe controlled by a weighted lever.

Figs. 9 and 10 show two forms of centrally pivoted single-faced shoes controlled by means of a weighted lever.

Figs. 11 and 12 show two forms of positively guided adjusting mechanism for single-faced shoes.

Fig. 13 is an enlarged front view of the shoe represented in Fig. 1, and showing its mounting on the frame or pole.

Fig. 14 is a plan view of the shoe proper.

Fig. 15 is a fragmental detail view, on a still larger scale and showing the connection between the shoe and the frame or pole.

With reference to Fig. 1, $k$ is the collector frame or pole pivotally connected at $l$ to the trolley base of the car or the top joint of a pantograph trolley frame. $a$ is the contact body or shoe which is pivotally journaled on the hollow or tubular shaft $o$. $v$ is the trolley wire. Arrow $i$ indicates the direction of travel of the car. The springs pressing the frame $k$ and the contact body $a$ towards the trolley wire, are not shown. R is the resultant of this pressure and of the friction acting at the contact surface.

The arms of frame $k$ are hollow, as shown in Figs. 13 and 15, and the ends 2 of shaft $o$ are inserted in the ends of the frame arms and suitably secured therein, as by means of screws 4, 4 which are themselves prevented from becoming loose by wires 5 that are passed through holes 9 formed transversely through the screw heads. The aforesaid shaft ends 2 are slightly bent and are provided with metal filling plugs 3.

In the constructions hitherto known, the resultant R had to pass through the pivot axis $o$ in order to secure the balance of the shoe and therefore could not intersect the contact surface $a_1$ at its center $d$. Hence the pressure was greatest at the front edge of the contact surface and diminished towards its rear edge, thereby subjecting the front edge to a premature wear.

According to my invention I secure uniform distribution of the pressure throughout the whole length of the contact surface, while at the same time allowing the use of the shoe on a trolley frame inclined in either travelling direction, these results being obtained by utilizing a turning moment to lower the front edge of the shoe in either travelling direction.

According to Fig. 1 this turning moment is attained by the use of a shoe $a$ having two counterpart working faces $a_1$ and $a_2$ and by arranging the pivot shaft or axis $o$ at an equal distance from both working surfaces $a_1$ and $a_2$, viz in the horizontal middle plane $x$—$x$ of the shoe and at one side of the centre of gravity G, so that the pressure resultant R which intersects the eccentric pivot axis $o$ also intersects the working surface $a_1$ in the vertical middle plane $y$—$y$ at $d$. If the collector is removed from the trolley wire into the position shown in dotted lines, the shoe will assume, owing to the eccentricity of its centre of gravity, a vertical position. If the shoe is brought again into the working position, the edge nearer to the pivot axis $o$ will come first into engagement with the trolley wire. Owing to the circumstance that the shoe $a$ describes an arc in rising, that one of its working surfaces will be turned upwards which will cause the centre of gravity G of the shoe to be located in front of the pivot axis $o$.

Figs. 2 and 3 show modifications of the shoe or contact piece, according to which the thickness of the contact piece decreases towards the rear edge in order to decrease the air resistance.

The parts $a_3$ and $a_4$ in Fig. 1 and the corresponding parts $a_e$ and $a_h$ in Figs. 2 and 3 forming the front and rear edges may be of different material and thickness from the parts $a_1$ and $a_2$ forming the working surfaces.

According to Fig. 1 the centre of gravity G lies in the geometrical axis $y$—$y$ of the shoe, so that the pivot axis $o$ has to be located outside of the geometrical axis. According to Fig. 4, however, the pivot axis $o$ is located in the geometrical axis of the shoe and the offsetting of the centre of gravity G is attained by providing within the shoe a weight $g$ secured by means of screws.

In the constructions shown in Figs. 1—4, the shoe assumes, when withdrawn from the trolley wire, as shown in Fig. 1 in dotted lines, a vertical position and is turned into the correct contact position when lifting the trolley frame $k$ owing solely to the fact that the shaft or axis $o$ travels along an arc of a circle. As, however, the shoe swings during its ascent, the arcuate movement of the shaft or axis is not sufficient to insure that the shoe will touch the trolley wire with the right face. In order to obviate this drawback I provide within the shoe as shown in Fig. 5, one spring $r_1$ or preferably two springs $r_1$ and $r_2$ secured at one end to the shaft $o$ and pressing at their free end against the walls of the contact piece.

One of such springs $r_1$ is sufficient, if an off-center balancing weight $g$ of suitable dimensions is arranged within the shoe as shown in Fig. 6.

The springs $r_1$ and $r_2$ and the eccentric weights of the contact piece or shoe are so balanced that the shoe, when removed from the trolley wire, as shown in dotted lines, will assume a position in which its longitudinal middle plane coincides with the plane of the trolley frame $k$.

In Fig. 6 I have shown separate sliding pieces $b$ detachably secured to the working faces of the shoe $a$. As shown in dotted lines at $c$ the outer edges of these sliding pieces are preferably bent towards the shoe $a$. The sliding pieces when worn, may be removed and replaced by new ones.

In the Fig. 7 I have shown a three-faced contact piece or shoe having a triangular cross section and three working faces $a_1$, $a_2$, $a_3$. The boring adapted to receive the spindle $o$ is located eccentrically in a cylindrical part $f$ to which the metal strips or sheets forming the contact faces are secured by means of screws $f_1$ while the centre of gravity G has a central position. In the position of the shaft $o$ shown in Fig. 7, the contact faces $a_1$ and $a_3$ will work alternately in case the collector travels in direction $i$ or in the opposite direction respectively. By turning the cylinder $f$, after having removed the screws $f_1$, into a position in which the shaft $o$ will be located in the angle between any other pair of working faces, for example $a_3$ and $a_2$, said faces $a_3$ and $a_2$ will work alternately according to the travelling direction of the shoe. The triangular shoe may be formed of three parts $q_1$, $q_2$ and $q_3$.

Instead of a balancing weight located within the hollow shoe, a weight $g$ arranged on a lever $z$ may be used as shown in Fig. 8. Lever $z$ is pivoted on the shaft $o$ and its swinging angle is limited by abutments $h$. A spring $r$ connecting one edge of the shoe $a$ with the lever $z$ secures the position of the shoe shown in dotted lines in Fig. 5, when removed from the trolley wire.

In using a single-faced shoe or contact piece, as shown in Fig. 9, the eccentric balancing weight must act in the position of the trolley frame $k$ corresponding to either travelling direction in a manner to lower the front edge of the shoe. For this purpose the weighted lever $z$ is pivoted at a point $m$ of the trolley frame $k$, located beyond the pivot shaft $o$ of the shoe. A pin $u$ on the weighted lever $z$ works in a slot $s$ arranged in the vertical axis of symmetry $y$—$y$ of the flange $n$. The farther the trolley frame $k$ is pressed downwards towards its horizontal position, the greater will be the leverage of the moment of the weight $g$ as the distance of the pivot $m$ from the middle plane $y$—$y$ increases. Hence the turning moment of the resultant R will be balanced independently of the position of frame $k$.

Another way to secure this balance, is shown in Fig. 10, according to which the weighted lever $z$ is connected with a pulley $p_2$ and the flange $n$ of the shoe $a$ with a pulley $p_1$ of smaller radius. Both pulleys are connected by means of a rope $e$. If the distance of the trolley wire $v$ from the trolley base $l$ decreases, that is to say, if the trolley frame $k$ approaches the horizontal position, the angle $w_1$ formed by the vertical axis $y$, $y$ and the trolley frame $k$ increases. Owing to the difference between the radii of pulleys $p_2$ and $p_1$, the difference between angle $w_1$ and the angle $w_2$ formed by the balancing lever $z$ and the trolley frame $k$ increases with the increase of angle $w_1$.

According to Fig. 11 the springs $r_1$ and $r_2$ connected at one end to points $A_1$, $A_2$ respectively of the single-faced contact piece or shoe $a$ and at the other end to point $o_1$ of lever $h^2$ pivoted to the shaft $o$ are provided to balance the turning moment of the resultant R. In order that lever $h^2$ may always span the front spring in either direction of travel, for example spring $r_1$ in the direction $i$ as shown in Fig. 11, the end $o_1$ of lever $h^2$ is connected by a rod or rope $k_1$ to a fixed point $o_3$ located underneath and at a distance $h_1$ from the pivot $o_2$ of the tilting trolley frame $k$, which is greater than the length of lever $h^2$, while the length of frame $k$ added to $h_1$ is equal to the length of rod $k_1$ added to the length of lever $h^2$.

The modification shown in Fig. 12 allows the use of the device shown in Fig. 11 in connection with pantograph trolley frames. With reference to Fig. 12, $k_4$ and $k_5$ are the upper links of the pantograph frame forming its top joint $o_2$. The inclined tilting frame $k$ is pivoted at its lower end to the top joint $o_2$ and bears at its upper end the pivot shaft $o$ of the contact piece or shoe $a$. A guiding bar $k_1$ connects pivot $o_1$ of the flange $n$ of the shoe $a$ with a guiding link $k_3$ at $o_3$. Guiding link $k_3$ may be provided either with a weight $g$ as shown in dotted lines or may be connected by means of springs $r_1$ and $r_2$ to points $B_1$ and $B_2$ located either on the links $k_4$ and $k_5$ of the pantograph trolley or on a trolley base of fixed height if such a one is used.

Having now fully described and ascertained the said invention and the manner in which it is to be performed, I declare, that what I claim is:

1. A current collector, comprising a hollow shoe having at least one flat contact surface of substantial width for engagement with a source of current supply and adapted to travel lengthwise along the same; a support to which the shoe is pivoted; and means tending to lower the front edge of the shoe during its travel in either direction.

2. A current collector, comprising a hollow shoe having at least one flat contact surface of substantial width for engagement with a source of current supply and adapted to travel lengthwise along the same; a support to which the shoe is pivoted at one side of its center of gravity; and means tending to lower the front edge of the shoe during its travel in either direction.

3. A current collector, comprising a hollow shoe having two oppositely-located, flat counterpart contact surfaces of substantial width for engagement with a source of current supply and adapted to travel lengthwise along the same alternatively, said surfaces having a length considerably greater than their width; and a support to which the shoe is pivoted between such surfaces.

4. A current collector, comprising a hollow shoe having two oppositely-located, flat counterpart contact surfaces of substantial width for engagement with a source of current supply and adapted to travel lengthwise along the same alternatively; a support to which the shoe is pivoted between such surfaces; and means tending to lower the front edge of the shoe during its travel in either direction.

5. A current collector, comprising a hollow shoe having a long, flat contact surface of substantial width for engagement with a source of current supply and adapted to travel lengthwise along the same; a support whereto the shoe is pivoted; and means for causing said shoe to bear throughout its length against said current source.

6. A current collector, comprising a hollow shoe having a long, flat contact surface of substantial width for engagement with a source of current supply and adapted to travel lengthwise along the same; a support whereto the shoe is pivoted; and a weight connected to said shoe and tending to lower the front edge thereof during travel.

7. A current collector, comprising a hollow shoe having a long, flat contact surface of substantial width for engagement with a source of current supply and adapted to travel lengthwise along the same; a support whereto the shoe is pivoted; and a weight disposed within and connected to said shoe and tending to lower the front edge thereof during travel.

8. A current collector, comprising a hollow shoe having a long, flat contact surface of substantial width for engagement with a source of current supply and adapted to travel lengthwise along the same; a support whereto the shoe is pivoted; and a spring associated with said shoe and tending to hold its contact surface parallel with the shoe support.

9. A current collector, comprising a hollow shoe having a long, flat contact surface of substantial width for engagement with a source of current supply and adapted to travel lengthwise along the same; a support whereto the shoe is pivoted; a balancing weight associated with said shoe; and a spring also associated with the shoe and tending to hold its contact surface parallel with the shoe support.

10. A current collector, according to claim 9, in which both the weight and the spring are disposed within the confines of the hollow shoe.

In testimony whereof I affix my signature.

JULIUS FISCHER DE TÓVÁROS.